(12) United States Patent
Trundle et al.

(10) Patent No.: US 11,457,183 B2
(45) Date of Patent: *Sep. 27, 2022

(54) DYNAMIC VIDEO EXCLUSION ZONES FOR PRIVACY

(71) Applicant: Alarm.com Incorporated, Tysons, VA (US)

(72) Inventors: Stephen Scott Trundle, Falls Church, VA (US); Daniel Todd Kerzner, McLean, VA (US); Donald Gerard Madden, Columbia, MD (US); Benjamin Asher Berg, Washington, DC (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/341,706

(22) Filed: Jun. 8, 2021

(65) Prior Publication Data

US 2021/0344879 A1 Nov. 4, 2021

Related U.S. Application Data

(63) Continuation of application No. 16/905,062, filed on Jun. 18, 2020, now Pat. No. 11,064,166.

(Continued)

(51) Int. Cl.
*H04N 7/18* (2006.01)
*G06T 7/00* (2017.01)
(Continued)

(52) U.S. Cl.
CPC ............ *H04N 7/185* (2013.01); *G06F 21/84* (2013.01); *G06T 7/0002* (2013.01); *H04N 5/23206* (2013.01); *G06T 2207/10016* (2013.01)

(58) Field of Classification Search
CPC ............ H04N 7/185; H04N 5/23206; H04N 5/23222; H04N 5/23241; H04N 5/23245;
(Continued)

(56) References Cited

U.S. PATENT DOCUMENTS

| 10,272,570 | B2 | 4/2019 | Storr | |
| 11,064,166 | B2 * | 7/2021 | Trundle | H04N 7/185 |

(Continued)

FOREIGN PATENT DOCUMENTS

WO WO 2018/039646 3/2018

OTHER PUBLICATIONS

PCT International Search Report and Written Opinion in International Application No. PCT/US2020/038481, dated Oct. 6, 2020, 9 pages.

(Continued)

*Primary Examiner* — Paulos M Natnael
(74) *Attorney, Agent, or Firm* — Fish & Richardson P.C.

(57) ABSTRACT

Methods, systems, and apparatus, including computer programs encoded on a computer storage medium, for preserving privacy in surveillance. The methods, systems, and apparatus include actions of determining a state of a monitoring system, determining an exclusion zone that is shown in a video, determining whether to obfuscate at least a portion of the video based on the exclusion zone and the state of the monitoring system, and obfuscating at least the portion of the video.

23 Claims, 3 Drawing Sheets

Related U.S. Application Data

(60) Provisional application No. 62/865,549, filed on Jun. 24, 2019.

(51) Int. Cl.
*G06F 21/84* (2013.01)
*H04N 5/232* (2006.01)

(58) Field of Classification Search
CPC ........ H04N 5/2354; H04N 7/18; G06F 21/84; G06F 21/6245; G06T 7/0002; G06T 2207/10016; G06V 20/52
See application file for complete search history.

(56) References Cited

U.S. PATENT DOCUMENTS

| | | |
|---|---|---|
| 2004/0135885 A1 | 7/2004 | Hage |
| 2007/0286520 A1 | 12/2007 | Zhang et al. |
| 2007/0296817 A1 | 12/2007 | Ebrahimi et al. |
| 2008/0117295 A1 | 5/2008 | Ebrahimi et al. |
| 2008/0181533 A1 | 7/2008 | Jung et al. |
| 2009/0201372 A1 | 8/2009 | O'Doherty et al. |
| 2014/0016854 A1 | 1/2014 | Nagatomo et al. |
| 2015/0145992 A1 | 5/2015 | Traff |
| 2015/0336270 A1 | 11/2015 | Storr |
| 2016/0324460 A1 | 11/2016 | Kusens |
| 2017/0076572 A1 | 3/2017 | Rao |
| 2017/0091908 A1 | 3/2017 | Takeda et al. |
| 2017/0094228 A1 | 3/2017 | Israelson |
| 2017/0193303 A1 | 7/2017 | Wexler et al. |
| 2018/0084228 A1 | 3/2018 | Pellom et al. |
| 2018/0107830 A1 | 4/2018 | Bobbitt et al. |
| 2018/0330591 A1 | 11/2018 | Tilkin et al. |
| 2019/0068895 A1 | 2/2019 | Hutz et al. |
| 2019/0138748 A1 | 5/2019 | Long et al. |
| 2020/0285904 A1 | 9/2020 | Gavrilovic et al. |
| 2020/0311417 A1 | 10/2020 | Lin |
| 2020/0372792 A1 | 11/2020 | Li et al. |
| 2020/0394411 A1 | 12/2020 | Dahlberg et al. |
| 2020/0404221 A1* | 12/2020 | Trundle .................. H04N 7/18 |

OTHER PUBLICATIONS

Extended European Search Report in European Appln. No. 20830641.5, dated Jul. 8, 2022, 8 pages.

* cited by examiner

DYNAMIC VIDEO EXCLUSION ZONES FOR PRIVACY

CROSS-REFERENCE TO RELATED APPLICATIONS

This application is a continuation of U.S. application Ser. No. 16/905,062, filed Jun. 18, 2020, now allowed, which claims the benefit of U.S. Provisional Application No. 62/865,549, filed Jun. 24, 2019. Both of these prior application are incorporated by reference in their entireties.

TECHNICAL FIELD

This disclosure application relates generally to monitoring systems, and more particularly, to privacy in monitoring systems.

BACKGROUND

A monitoring system for a property can include various components including sensors, cameras, and other devices. The monitoring system can be used to perform surveillance in the property.

SUMMARY

Techniques are described for preserving privacy in surveillance.

Video systems can be a powerful tool for security, robotics and automation, care monitoring, health analytics, and many other applications. However, as the number of cameras in the home or business grows, it becomes difficult to ensure the privacy of users, or to know when and where one might be observed by a camera.

This problem may be addressed by having a system where dynamic exclusion zones may be defined. A dynamic exclusion zone may be an exclusion zone that may be activated and deactivated based on one or more of a state of a security system, user preferences, context, or general expectations. For example, a dynamic exclusion zone may be defined for a bedroom that specifies that an exclusion zone should be activated when the security system is unarmed and should be de-activated when the security system is armed.

An exclusion zone may be thought of as virtual privacy screens or volumes, behind or within which, objects, persons, and scenes would be obscured or occluded within video. For example, an activated exclusion zone for a bedroom may cause a portion of video that shows anything in the bedroom to be replaced with black pixels. In another example, an activated exclusion zone for a bedroom may cause a portion of video that shows humans in the bedroom to be replaced with black pixels. In yet another example, a de-activated exclusion zone may cause a video from a camera to be stored and shown without modification.

A system that provides dynamic exclusion zones may provide benefits in keeping private areas private and create a better user experience. Additionally, providing such privacy features enables cameras and other sensors to be used for important tasks (such as fall monitoring) in areas where the cameras otherwise would not be placed (in a bedroom or bathroom).

In general, one innovative aspect of the subject matter described in this specification can be embodied in a method for preserving privacy in surveillance, the method include the actions of determining a state of a monitoring system, determining an exclusion zone that is shown in a video, determining whether to obfuscate at least a portion of the video based on the exclusion zone and the state of the monitoring system, and obfuscating at least the portion of the video.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, determining an exclusion zone that is shown in a video includes receiving, from an exclusion zone definition database, an exclusion zone definition that specifies the exclusion zone and determining, based on the exclusion zone definition, that the video shows the exclusion zone. In certain aspects, the exclusion zone definition specifies that a particular room is to be obfuscated when the monitoring system is in a particular state and not obfuscated when the monitoring system is not in the particular state. In some implementations, the particular room includes a bathroom and the particular state includes unarmed.

In some aspects, the exclusion zone definition specifies that in a living room, humans are always to be obfuscated, and when the state of the monitoring system is unarmed, an entirety of the living room is to be obfuscated. In certain aspects, determining whether to obfuscate at least a portion of the video based on the exclusion zone and the state of the monitoring system includes determining that the exclusion zone is to be obfuscated when the monitoring system is in a particular state and that the state of the monitoring system is in the particular state and in response to determining that the exclusion zone is to be obfuscated when the monitoring system is in the particular state and that the state of the monitoring system is in the particular state, determining to obfuscate the exclusion zone in the video.

In some implementations, determining a state of a monitoring system includes receiving, from a control unit of the monitoring system and by an obfuscation engine, an indication that the monitoring system is unarmed. In certain aspects, obfuscating at least the portion of the video includes replacing pixels in the video that correspond to the exclusion zone with black pixels. In some aspects, obfuscating at least the portion of the video includes storing the video labeled with metadata that specifies which portions of the video should be obscured for which types of users when the video is played.

The subject matter described in this specification can be implemented in various embodiments and may result in one or more of the following advantages. In some implementations, privacy may be provided with surveillance. For example, video may be captured and stored of an area while still providing privacy for people in the area. In some implementations, an amount of user interactions with a surveillance system may be reduced. For example, instead of a user manually disabling surveillance when they want privacy, e.g., when the user gets home, and then manually re-enabling surveillance, e.g., when the user leaves home, the user may define a dynamic exclusion zone that is then used to automatically and dynamically obfuscate video. In some implementations, a size of video stored may be reduced. For example, portions of video that are obfuscated may appear all black which may be represented with less data than what was originally captured in the portions of video.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
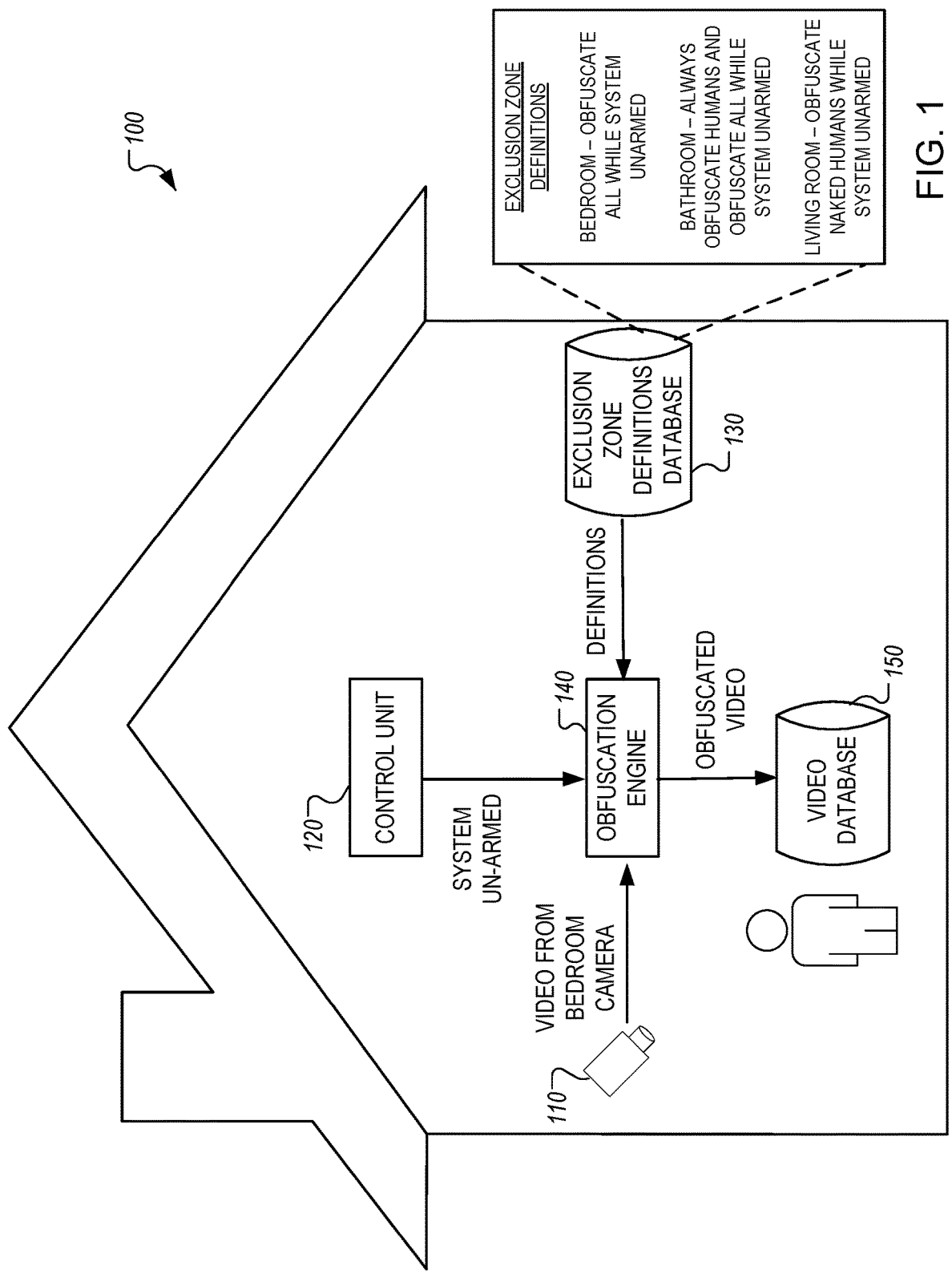
FIG. 1 is a diagram of an example system for preserving privacy in surveillance.

FIG. 1 is a diagram of an example system 100 for preserving privacy in surveillance. The system 100 includes a camera 110, a control unit 120, an exclusion zone definition database 130, an obfuscation engine 140, and a video database 150.

The camera 110 can include a video camera, a digital camera, or any other optical instrument for recording and capturing images. For example, the camera 110 may be positioned inside a bedroom and have a view of the bedroom. The camera 110 may be a fixed still or video camera, a pan-tilt-zoom (PTZ) camera, a handheld or body worn camera, or a camera affixed to a robotic device which can move around a property. Such a moving camera may use an existing map or model of the property to recognize exclusion zones within the camera view by evaluating the predicted projection of the camera onto the map or model or by matching the captured imagery to the map, model, or specific objects or features within the area.

The camera 110 may capture video and provide the video to the obfuscation engine 140. For example, the camera 110 may provide video of intruders in the bedroom to the obfuscation engine 140. In another example, the camera 110 may provide video of residents in the bedroom to the obfuscation engine 140.

The control unit 120 may be a control unit of a security system and may provide security system data to the obfuscation engine 140. For example, the control unit 120 may be a security panel of a security system and may provide data to the obfuscation engine 140 of "State=System Unarmed" while the security system is unarmed. In another example, the control unit 120 may provide data to the obfuscation engine 140 of "State=System Armed" while the security system is armed.

Other security system data that the control unit 120 may provide includes one or more of alarm state, state of various sensors, user direction (such as calling for help or pressing a panic button), presence of certain users, known or unknown, based on video recognition, or presence of another signal such as a wireless device, voice or other audio cue, etc., or the number of people present in the scene, or the presence of people vs. animals (may want to see what the dog is doing in the bathroom, but not what any person is).

The exclusion zone definitions database 130 may store exclusion zone definitions. For example, the database 130 may store a first exclusion zone definition for a bedroom, a second exclusion zone definition for a bathroom, and a third exclusion zone definition for a living room. The exclusion zone definitions may specify where within a property the exclusion zones apply and also when the exclusion zone should be activated. For example, the first exclusion zone definition for the bedroom may specify that the exclusion zone be only activated while a security system of the property is unarmed. In another example, the second exclusion zone definition for the bathroom may specify that the second exclusion zone may be activated while the system is unarmed and always activated for humans so that humans are always obscured. In yet another example, the third exclusion zone definition for the living room may specify that the third exclusion zone may be only activated while the system is unarmed for humans that are naked.

The exclusion zone definitions may be manually created or inferred based on context. The system 100 may learn which areas to apply exclusion zones for by observing where people appear in states of undress regularly. Being undressed may imply that a person considers that area more private, even if they are fully clothed later. Additionally or alternatively, the system 100 could learn to recognize common private areas by analyzing areas across properties where other users define exclusion zones. For example, the system 100 may learn that bedrooms, bathrooms, and the hallway between them are typically defined as exclusion zones, and suggest this as a default for new user. In some implementations, the system 100 may similarly learn when the exclusion zones should be applied. For example, the system 100 may generate the exclusion zones based on learning a schedule of on during working hours and off at night.

In the case of the exclusion zone definition being manually created, the system 100 may enable a user to use a device, e.g., a computer, a smartphone, or a laptop, to define where an exclusion zone should be located and when the exclusion zone should be active. For example, a user may have previously accessed a security system portal on their computer to define the exclusion zone definition for the living room.

The obfuscation engine 140 may receive the video from the camera 110, the security system data from the control unit 120, and the definitions from the exclusion zone definitions database 130 and then obfuscate the video. For example, the obfuscation engine 140 may receive the video of the bedroom from the camera 110, receive security system data that indicates that the security system is un-armed, and receive an exclusion zone definition that specifies to obfuscate everything in the bedroom while the system is unarmed, and, in response, replace all the pixels in the video that show the bedroom with black pixels.

In another example, the obfuscation engine 140 may receive video from a camera in a hallway that also shows part of an interior of a bathroom, receive security system data that indicates that the security system is armed, and receive an exclusion zone definition that specifies to obfuscate all humans in the bathroom and obfuscate the entire interior of the bathroom while the system is unarmed, and, in response, replace all the pixels in the video that show a human in the bathroom with black pixels.

The obfuscation engine 140 may obfuscate the video in a number of different ways including replacing pixels with black pixels, replacing pixels without blurred pixels, or replacing pixels that show a human with an outline of a human.

The obfuscation engine 140 may obfuscate the video based on determining the portions of the video that correspond to the location that the exclusion zones apply to. For example, the obfuscation engine 140 may determine that a third of the video from a camera shows a bathroom and a remaining part of the video shows a bedroom.

In some implementations, the obfuscation engine 140 may use depth/3D sensors and/or structure from motion to more accurately apply exclusion zones. For example, a camera may look into a room that has an exclusion zone at the threshold and the exclusion zone definition for the room may specify to obscure anything in the room. Accordingly, as a person walks across the threshold and into the room, the obfuscation engine 140 may use 3D information to more accurately determine when a person crosses the threshold, e.g., when the detected range from the camera to the person is equal to the range from the camera to the doorway they are walking through, and thus determine when to begin to obscure the pixels which represent the person in the video/imagery.

The obfuscation engine 140 may then store the obfuscated video in the video database 150. For example, the obfuscation engine 140 may store the video with pixels of a human replaced with black pixels in the video database 150. Alternatively, the obfuscation engine 140 may allow recovery of some or all of the video in the exclusion zones, possibly for evidential purposes.

This might be accomplished by encrypting portions of each video frame, making them unreadable without a key. Various levels of resolution might be encoded (and protected with encryption), allowing a viewer to unlock a blurred or pixelated version of the video within the zones, but not the full resolution version. Metadata describing the exclusion zones could be used to dynamically obscure the exclusion zones depending on various factors. Metadata used to describe the exclusion zone could include abstracted information about the activity in the zone, such as a basic count of people in the zone, or basic status of those people (sitting, standing, motionless on the ground).

In some implementations, the obfuscation engine 140 may show all portions of images without obfuscation if a security event, e.g., an intruder detection, is detected near the time the images are captured or if a person viewing the images has privileges to view images that are not obfuscated, e.g., is the property owner.

In some implementations, the obfuscation engine 140 may grant viewers of video varying levels of privilege to view video. Some implementations may enable different exclusion zones for different viewers, or different rendering styles or levels of obfuscation depending on the viewer. Certain implementations might allow viewers to escalated privileges in exceptional situations. For example, a user may check in on their parent's video feed to find that they are inside an exclusion zone and not answering requests for an audio call. In another example, the system 100 may provide analytics that indicate the parents are lying on the floor and this information is overlaid in the exclusion zone of the video because the user has been granted that permission by their parent. The user may then notify a central station and grant permission based on a pre-arrangement between the monitoring company, the parent, and the user, to view the unobscured video, confirm that they are lying on the ground, and dispatch emergency medical personnel.

In some implementations, the system 100 may retroactively apply an exclusion to video that has previously been captured, based on recognizing a person it did not immediately recognize, recognizing an emerging activity, a change in arm state, cancelling alarm, or other change. The system 100 may reach back into archives and edit the video or the metadata dictating the playback of the video to apply the exclusion zones. In cases where the video may be viewed immediately and this sort of retroactive exclusion proves common, the system 100 may inject delay into the live playback in order to ensure the exclusion zone might be applied before the video is viewed.

In some implementations, the system 100 may apply exclusion zones without the knowledge of the viewer. The system 100 may use background replacement to erase people or other objects in the exclusion zones from the video rather than obscuring them or the area.

In some implementations, the obfuscation engine 140 may instead be incorporated into the camera 110. For example, the camera 110 may alter the pixels which map to areas inside the exclusion zones and store video for only the pixels that map to areas outside the exclusion zones (essentially permanent exclusion of those areas inside the exclusion zone). Accordingly, the pixels that correspond to exclusion zones may never be transferred outside the camera 110.

In this implementations, exclusion zones may be communicated to cameras as the cameras are introduced to the site, whether the camera are new installs or those belonging to guests or visitors allowed access to the site. For instance, a visitor might enter the home in order to perform a service, and wear or carry a camera to document the visit for the homeowner or supervisor. As part of gaining entry, the exclusion zone rules would be communicated to the camera and the camera would accept a contract to honor them. This contract might include dynamic rules or objects and activities not to capture in addition to the zones.

In some implementations, existing video, such as that captured by the above "visiting" camera can be reviewed during streaming or post-recording to verify that exclusion zones have been enforced, or to apply the exclusion zones as necessary. In some implementations, the system 100 may also send notifications to alert that a visiting camera was pointed at an exclusion zone for a certain amount of time. For example, the obfuscation engine 140 may review video captured by a visiting camera, determine that the video showed thirty seconds of a bedroom that had an exclusion zone applied, and provide a notification to a device of a user that a visiting camera showed thirty seconds of a bedroom that had an exclusion zone applied.

In some implementations, the data being obfuscated need not be limited to video data. Infrared (IR) data, depth sensor data, and audio data may all contain content that users may not want recorded or shared. The system 100 may treat IR or depth sensors (or any other sensor system producing understandable 3D data) similarly to imagery sensors so that data within the location specified would be removed or obfuscated. For example, the system 100 may localize audio to certain rooms based on input from multiple devices or devices with multiple microphones, and the obfuscation engine 140 may then obfuscate audio that can from private rooms as specified by the exclusion zone definitions and not audio that came from other rooms. Audio could also be filtered based on certain voices or sounds. For example, the system 100 may record barking dogs, gunshots, and breaking glass, but not conversations between familiar voices.

Figure 2:
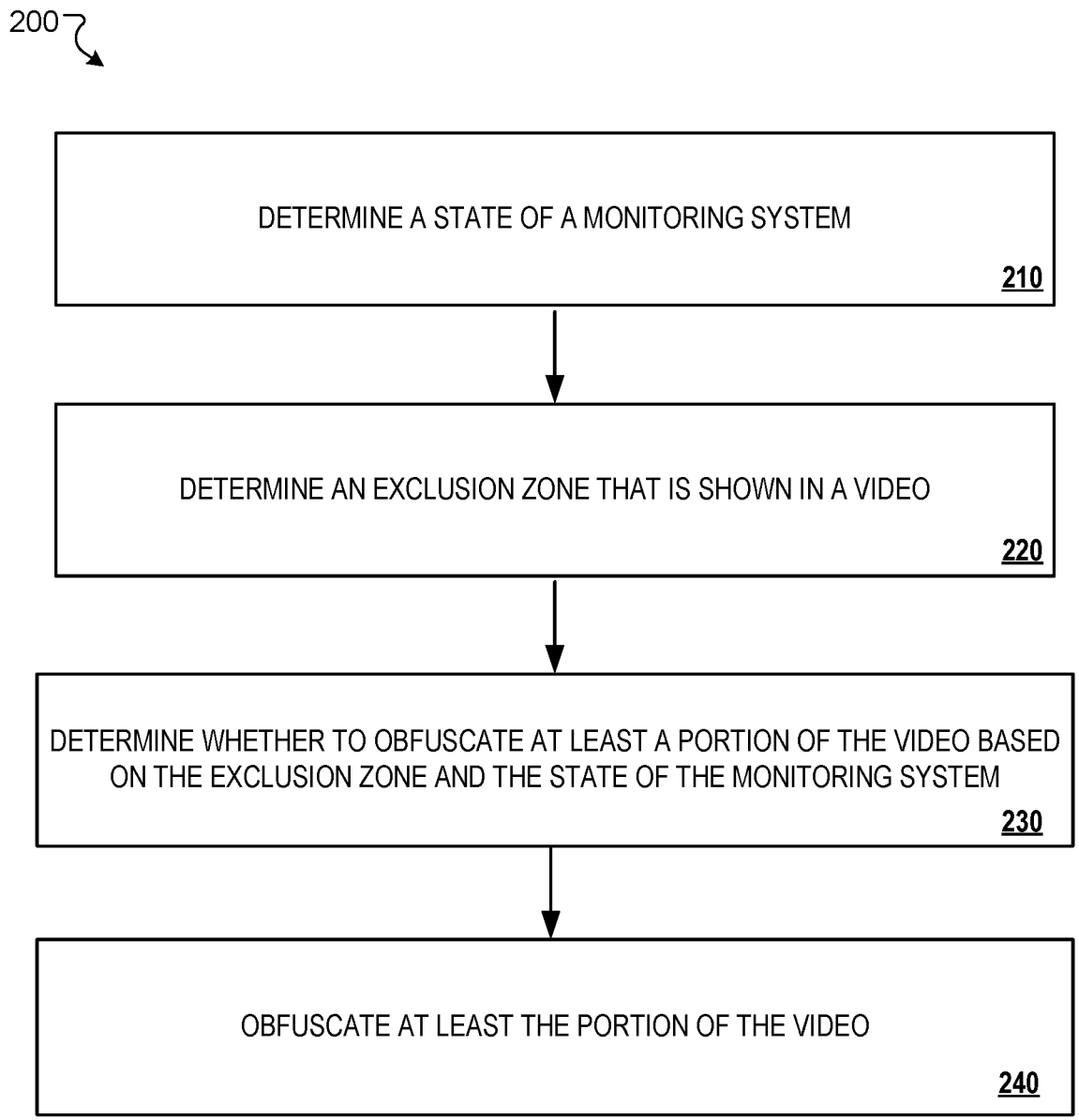
FIG. 2 is a flowchart of an example process for preserving privacy in surveillance.

FIG. 2 is a flow chart illustrating an example process 200 for preserving privacy. The process 200 can be performed by the system 100 shown in FIG. 1 or another system. For example, operations of the process 400 can be performed by the obfuscation engine 140. In another example, operations of the process 400 can be performed by the camera 110 where the camera 110 itself performs obfuscation.

The process 200 includes determining a state of a monitoring system (210). For example, the obfuscation engine 140 may determine that the monitoring system is either armed or unarmed. In some implementations, determining a state of a monitoring system includes receiving, from a control unit of the monitoring system and by an obfuscation engine, an indication that the monitoring system is unarmed. For example, the obfuscation engine 140 may receive an indication from the control unit 120 that the system is armed. In another example, the obfuscation engine 140 may receive an indication from the control unit 120 that the system is unarmed.

The process 200 includes determining an exclusion zone that is shown in a video (220). For example, the obfuscation engine 140 may determine that an exclusion zone is shown in video captured by a camera with a view of a bathroom. In another example, the obfuscation engine 140 may determine that an exclusion zone is not shown in video captured of a front door of a home.

In some implementations, determining an exclusion zone that is shown in a video includes receiving, from an exclusion zone definition database, an exclusion zone definition that specifies the exclusion zone and determining, based on the exclusion zone definition, that the video shows the exclusion zone. For example, the obfuscation engine 140 may receive an exclusion zone definition from the exclusion zone definition database 130 that specifies that humans should always be obfuscated in the video of a bathroom and the entire bathroom should be obfuscated when the system is unarmed, determine from the video that the bathroom is shown in the video and, in response, determine that an exclusion zone for the bathroom is shown in the video. In another example, the exclusion zone definition specifies that in a living room, humans are always to be obfuscated, and when the state of the monitoring system is unarmed, an entirety of the living room is to be obfuscated.

The process 200 includes determining whether to obfuscate at least a portion of the video based on the exclusion zone and the state of the monitoring system (230). For example, the obfuscation engine 140 may use object recognition on the pixels in the video to determine that a human is shown in the bathroom, determine that the system is armed, and, in response, determine just to obscure the portion of the video that shows the human.

In some implementations, determining whether to obfuscate at least a portion of the video based on the exclusion zone and the state of the monitoring system includes determining that the exclusion zone is to be obfuscated when the monitoring system is in a particular state and that the state of the monitoring system is in the particular state and, in response to determining that the exclusion zone is to be obfuscated when the monitoring system is in the particular state and that the state of the monitoring system is in the particular state, determining to obfuscate the exclusion zone in the video. For example, the obfuscation engine 140 may determine that an exclusion zone definition specifies that an entirety of a living room as shown in video is to be obfuscated when the system is unarmed and that the monitoring system is in an unarmed state and, in response, determine to obfuscate the entirety of the living room in the video while leaving unobfuscated the remaining portions of the video that do not show the living room.

The process 200 includes obfuscating at least a portion of the video (240). For example, the obfuscation engine 140 may obfuscate a portion of the video that shows a living room. In some implementations, obfuscating at least the portion of the video includes replacing pixels in the video that correspond to the exclusion zone with black pixels. For example, the obfuscation engine 140 may replace the portions of the human in the video while the human is in the bathroom with black pixels and then stored the modified video in the video database 150.

In some implementations, obfuscating at least the portion of the video includes storing the video labeled with metadata that specifies which portions of the video should be obscured for which types of users when the video is played. For example, the obfuscation engine 140 may store the unmodified video in the database 150 labeled with metadata that specifies which portions of the video should be obscured for which types of users when the video is played.

Figure 3:
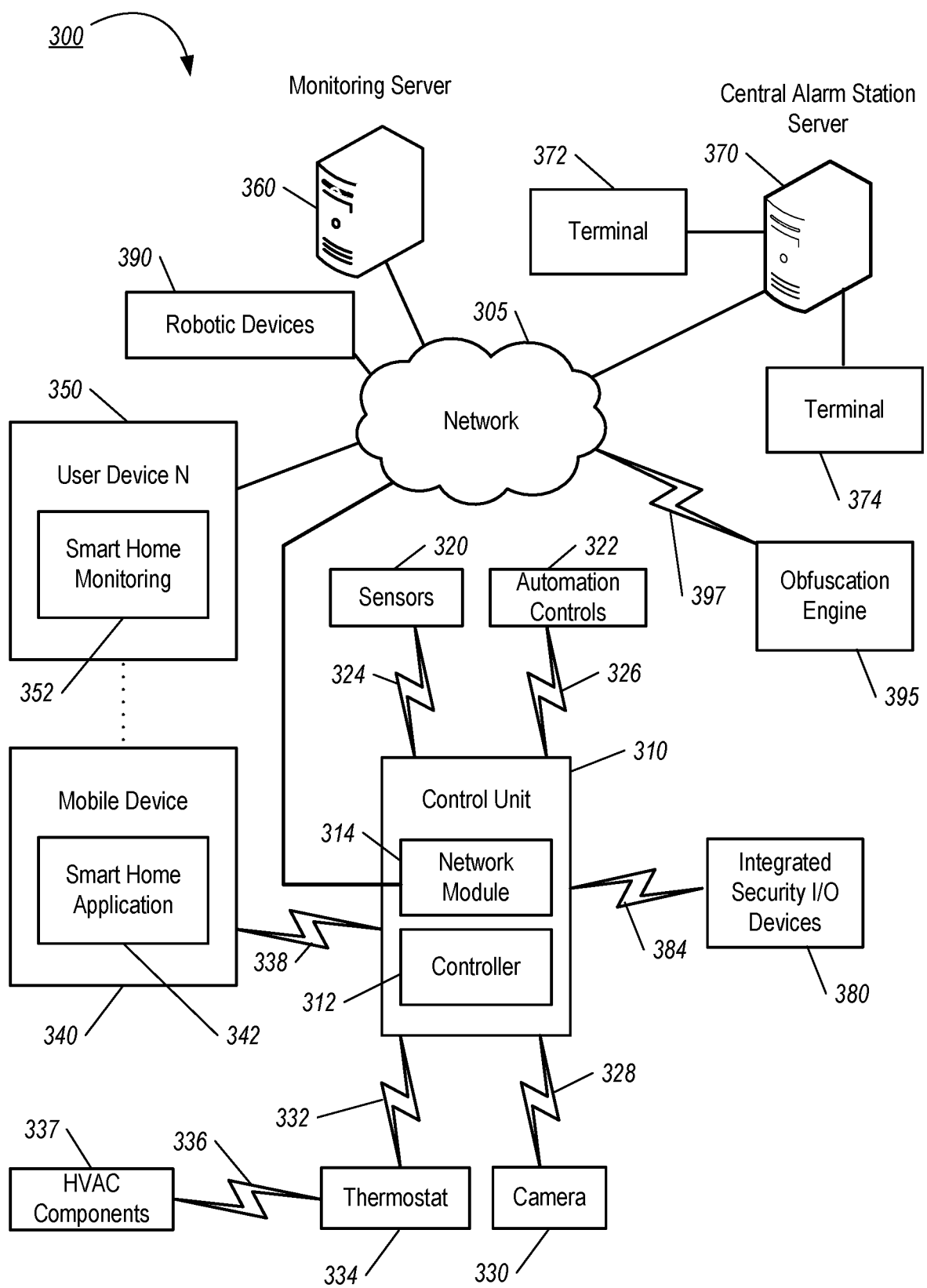
FIG. 3 is a diagram illustrating an example of a home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 108). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The system 300 further includes an obfuscation engine 395 in communication with the control unit 310 through a communication link 397, which similarly to as described above in regards to communication links 324, 326, 328, 332, 338, and 384, may be wired or wireless and include a local network. The obfuscation engine 295 may be the obfuscation engine 140, the control unit 310 may be the control unit 120, and the camera 330 may be the camera 110. In some implementations, the robotic devices 390 may navigate based on the exclusion zones that are currently being applied. For example, the robotic devices 390 may determine that an exclusion zone is being applied to a bathroom and, in response, determine to navigate so that cameras of the robotic devices 390 do not point towards the bathroom so that video of the bathroom is not captured.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   determining an arming state of a monitoring system;
   determining an exclusion zone that is shown in a video;
   determining whether to obfuscate at least a portion of the video based on the exclusion zone and the arming state of the monitoring system, wherein determining whether to obfuscate at least the portion of the video based on the exclusion zone and the arming state of the monitoring system includes:
   determining that humans in the exclusion zone are to be obfuscated when the monitoring system is in a particular arming state and that the arming state of the monitoring system is in the particular arming state; and
   in response to determining that humans in the exclusion zone are to be obfuscated when the monitoring system is in the particular arming state and that the arming state of the monitoring system is in the particular arming state, determining to obfuscate humans in the exclusion zone in the video; and
   obfuscating at least the portion of the video that shows a human in the exclusion zone without obfuscating another portion of the video that shows a portion of the exclusion zone without any humans.

2. The method of claim 1, wherein determining an exclusion zone that is shown in a video comprises:
   receiving, from an exclusion zone definition database, an exclusion zone definition that specifies the exclusion zone; and
   determining, based on the exclusion zone definition, that the video shows the exclusion zone.

3. The method of claim 2, wherein the exclusion zone definition specifies that a particular room is to be obfuscated when the monitoring system is in a particular state and not obfuscated when the monitoring system is not in the particular state.

4. The method of claim 3, wherein the particular room comprises a bathroom and the particular state comprises unarmed.

5. The method of claim 2, wherein the exclusion zone definition specifies that in a living room, humans are always to be obfuscated, and when the state of the monitoring system is unarmed, an entirety of the living room is to be obfuscated.

6. The method of claim 2, wherein determining that humans in the exclusion zone are to be obfuscated when the monitoring system is in a particular arming state and that the arming state of the monitoring system is in the particular arming state comprises:
   determining that the exclusion zone definition specifies that only humans are to be obfuscated in the exclusion zone during the particular arming state.

7. The method of claim 1, wherein determining a state of a monitoring system comprises:
   receiving, from a control unit of the monitoring system and by an obfuscation engine, an indication that the monitoring system is unarmed.

8. The method of claim 1, wherein obfuscating at least the portion of the video comprises:
   replacing pixels in the video that correspond to the exclusion zone with black pixels.

9. The method of claim 1, wherein obfuscating at least the portion of the video comprises:
   replacing pixels in the video that correspond to the human in the exclusion zone with black pixels.

10. The method of claim 1, wherein obfuscating at least the portion of the video comprises:
    storing the video labeled with metadata that specifies which portions of the video should be obscured for which types of users when the video is played.

11. A system comprising:
    one or more computers and one or more storage devices storing instructions that are operable, when executed by the one or more computers, to cause the one or more computers to perform operations comprising:
    determining an arming state of a monitoring system;

determining an exclusion zone that is shown in a video;
determining whether to obfuscate at least a portion of the video based on the exclusion zone and the arming state of the monitoring system, wherein determining whether to obfuscate at least the portion of the video based on the exclusion zone and the arming state of the monitoring system includes:
  determining that humans in the exclusion zone are to be obfuscated when the monitoring system is in a particular arming state and that the arming state of the monitoring system is in the particular arming state; and
  in response to determining that humans in the exclusion zone are to be obfuscated when the monitoring system is in the particular arming state and that the arming state of the monitoring system is in the particular arming state, determining to obfuscate humans in the exclusion zone in the video; and
obfuscating at least the portion of the video that shows a human in the exclusion zone without obfuscating another portion of the video that shows a portion of the exclusion zone without any humans.

12. The system of claim 11, wherein determining an exclusion zone that is shown in a video comprises:
  receiving, from an exclusion zone definition database, an exclusion zone definition that specifies the exclusion zone; and
  determining, based on the exclusion zone definition, that the video shows the exclusion zone.

13. The system of claim 12, wherein the exclusion zone definition specifies that a particular room is to be obfuscated when the monitoring system is in a particular state and not obfuscated when the monitoring system is not in the particular state.

14. The system of claim 13, wherein the particular room comprises a bathroom and the particular state comprises unarmed.

15. The system of claim 12, wherein the exclusion zone definition specifies that in a living room, humans are always to be obfuscated, and when the state of the monitoring system is unarmed, an entirety of the living room is to be obfuscated.

16. The system of claim 12, wherein determining that humans in the exclusion zone are to be obfuscated when the monitoring system is in a particular arming state and that the arming state of the monitoring system is in the particular arming state comprises:
  determining that the exclusion zone definition specifies that only humans are to be obfuscated in the exclusion zone during the particular arming state.

17. The system of claim 11, wherein determining a state of a monitoring system comprises:
  receiving, from a control unit of the monitoring system and by an obfuscation engine, an indication that the monitoring system is unarmed.

18. The system of claim 11, wherein obfuscating at least the portion of the video comprises:
  replacing pixels in the video that correspond to the exclusion zone with black pixels.

19. The system of claim 11, wherein obfuscating at least the portion of the video comprises:
  replacing pixels in the video that correspond to the human in the exclusion zone with black pixels.

20. The system of claim 11, wherein obfuscating at least the portion of the video comprises:
  storing the video labeled with metadata that specifies which portions of the video should be obscured for which types of users when the video is played.

21. A non-transitory computer-readable medium storing software comprising instructions executable by one or more computers which, upon such execution, cause the one or more computers to perform operations comprising:
  determining a state of a monitoring system;
  determining an exclusion zone that is shown in a video;
  determining whether to obfuscate at least a portion of the video based on the exclusion zone and the state of the monitoring system; and
  obfuscating at least the portion of the video.

22. The medium of claim 21, wherein determining an exclusion zone that is shown in a video comprises:
  receiving, from an exclusion zone definition database, an exclusion zone definition that specifies the exclusion zone; and
  determining, based on the exclusion zone definition, that the video shows the exclusion zone.

23. The medium of claim 22, wherein determining that humans in the exclusion zone are to be obfuscated when the monitoring system is in a particular arming state and that the arming state of the monitoring system is in the particular arming state comprises:
  determining that the exclusion zone definition specifies that only humans are to be obfuscated in the exclusion zone during the particular arming state.

\* \* \* \* \*